United States Patent Office 3,205,082
Patented Sept. 7, 1965

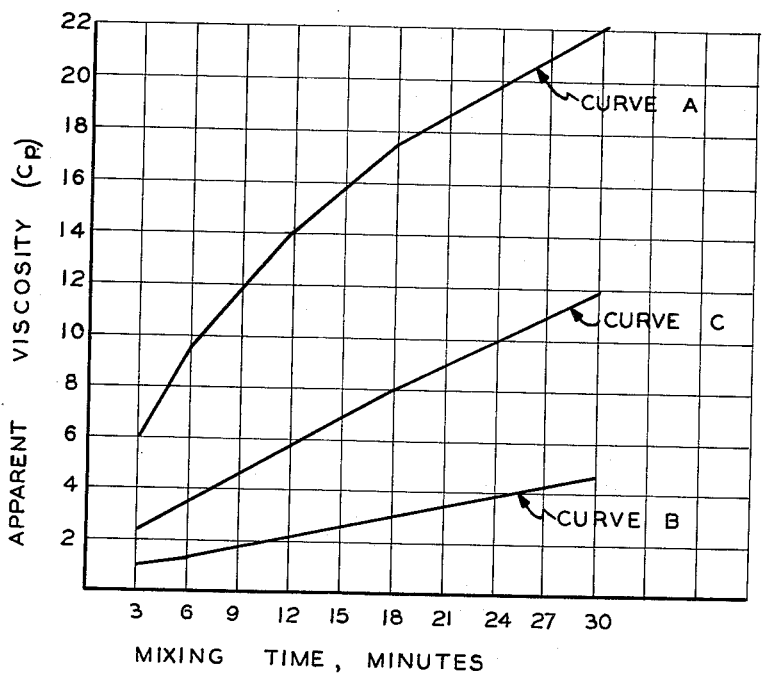
EFFECT OF FLUID ENERGY GRINDING COLLOIDAL ATTAPULGITE CLAY WITH AND WITHOUT MgO ADDITION.

3,205,082
ATTAPULGITE CLAY THICKENING AGENT AND
METHOD FOR MAKING THE SAME
John B. Buffett, Tallahassee, Fla., assignor to Minerals & Chemicals Philipp Corporation, Menlo Park, N.J., a corporation of Maryland
Filed Nov. 29, 1962, Ser. No. 240,779
7 Claims. (Cl. 106—72)

This invention relates to colloidal attapulgite clay and is especially directed to colloidal attapulgite clay which undergoes a particular type of grinding treatment; namely, fluid energy grinding, in order to put the clay material into an extremely finely divided form that is required for certain commercial applications of the colloidal clay.

Attapulgite clay is a unique type of clay material that is mined principally in the southeastern part of the United States. The raw clay, as mined, consists for the most part of the clay mineral attapulgite, a magnesium aluminosilicate mineral. Usually, small amounts of bentonite clay and other minerals are associated with the attapulgite.

Raw attapulgite clay has colloidal properies, viz., when agitated in water, the clay aggregates can be disposed into the ultimate colloidally dimensioned clays crystals that compose the aggregates of clay. As a result, the raw clay is useful as an agent to thicken aqueous liquids. The colloidal properties of attapulgite clay, and hence the ability of the clay to body aqueous liquids, are destroyed or impaired when the clay is dried to a volatile matter content (V.M.) below about 18%. Volatile matter is the weight percentage of a material that is eliminated when the material is heated to constant weight at 1800° F. In the case of attapulgite clay, water accounts for substantially all of the volatile matter.

For many applications of the colloidal form of attapulgite clay (i.e., attapulgite which has never been dried to a V.M. below about 18%), the presence of mesh size particles in the clay product is not detrimental. By way of example, attapulgite drilling mul clay is commercially supplied in the form of small granules of which as much at 25% to 50% by weight are larger than 325 mesh. These relatively coarse particles can be produced by mildly drying the raw clay, preferably raw clay that has been extruded to enhance the collodial properties of the clay, and grinding the mildly dried clay in a hammer mill or a roller mill.

For other applications of the colloidal clay, however, it is essential that virtually all of the clay material be in the form of micron size particles, i.e., at least 99%, and preferably 100% by weight of the particles must be finer than 325 mesh (44 microns). By way of illustration, colloidal attapulgite clay employed as a laytex paint thickening agent must be free from particles coarser than 44 microns which would impair the properties of the coating obtained with the latex composition. Likewise, colloidal attapulgite clay employed as a stabilizing agent for agricultural emulsions must be free from plus 44 micron particles which would erode the nozzles that are employed to apply the emulsions.

A colloidal attapulgite clay free from mesh size particles, i.e., particles larger than 44 microns, cannot be obtained with hammer mills and roller mills. To obtain such a material, grinding mills of the type known as "fluid energy mills" or "jet mills" must be employed. In these mills, the mesh size clay particles are suspended in a stream of an elastic fluid traveling at high velocity. The suspended clay particles are subjected to impingement or collision against one another. Ruptured clay particles of suitable fineness are withdrawn from the mill by an elutriation system and the coarse particles are subjected to further impingement against each other and fines withdrawn. This is repeated until a clay product of suitable degree of fineness is obtained.

For reasons not presently understood, fluid energy grinding of colloidal attapulgite clay has a very adverse effect upon the colloidal properties of the clay. This is true even when fluid energy grinding of the clay is carried out under conditions in which little or no undesirable reduction in volatile matter of the clay takes place. As a result, considerably greater quantities of fluid energy ground collodial attapulgite clay must be employed to obtain an aqueous clay dispersion of given viscosity than when a coarser collodial attapulgite clay material is used. For example, a 5% aqueous dispersion of an extruded colloidal attapulgite clay that had been coarse ground in a roller mill to 100% minus 48 mesh and 50% plus 325 mesh had an apparent viscosity of about 29 cp. (Fann) after being mixed for 30 minutes in a pump mixer. The roller milled extruded clay was then fluid energy milled without appreciable loss of volatile matter to a commercial specification of 99.8% minus 44 microns and 50% minus 5 microns. A 5% aqueous dispersion of this clay had an apparent viscosity of only about 5 cp. after 30 minutes mixing in the pump mixer. In effect, fluid energy grinding reduced the effective thickening capacity of the clay by more than 80%. Therefore, appreciably more of the powdered colloidal clay would be required to thicken an aqueous vehicle to the same apparent viscosity than would be required if a coarser particle size form of the colloidal clay could be used.

Accordingly, it is an object of this invention to provide a fluid energy milled colloidal form of attapulgite clay which is more effective as a thickening agent than fluid energy milled colloidal attapulgite clay of the prior art.

Another object is the provision of a method for producing a micron size colloidal attapulgite clay product that is markedly superior as a thickening agent to presently available grades of fluid energy milled colloidal attapulgite clay products.

Stated in another manner, an object of the invention is the provision of a method for avoiding or counteracting the adverse effect of fluid energy milling upon the colloidal properties of attapulgite clay.

This invention is a result of the discovery that the colloidal form of attapulgite clay can be fluid energy milled with minimized impairment of the colloidal properties of the clay if the fluid energy milling of the collodial attapulgite clay is conducted in the presence of small quantities of an inorganic additive material, hereinafter set forth.

Stated briefly, in accordance with this invention, an improved micron size collodial attapulgite clay thickening agent is obtained by fluid energy grinding collodial attapulgite clay in intimate association with a small amount of a basic magneisum additive material selected from the group consisting of $Mg(OH)_2$ and hydratable MgO, the fluid energy grinding of the mixture of clay and basic magneisum additive material being carried out under conditions of temperature which minimize dehydration of the attapulgite clay.

The improvement in colloidal properties of fluid energy milled attapulgite clay that is realized by conducting the fluid energy grinding of the clay in the presence of said basic magnesium compound, in accordance with this invention, represents a spectacular advance over the effect of the same magnesium base material on the colloidal properties of attapulgite clay which has not been fluid energy milled. By way of example, the incorporation of small amounts of hydratable MgO with extruded raw attapulgite clay that is ground in a roller mill to 100% minus 48 mesh and 50% minus 325 mesh, has at most a modest effect upon the water thickening powers of the colloidal clay. At best a 20% to 30% improvement in viscosity can be expected by using an optimum quantity of the hydratable MgO with the roller milled clay. In marked contrast, when roller milled colloidal attapulgite extrudate containing MgO additive is fluid energy milled, in accordance with this invention, the clay material is from 100% to over 400% more effective as a thickening agent for water than clay material fluid energy milled in the absence of the magnesium base. By way of example, an aqueous dispersion containing 5% of a fluid energy milled colloidal attapulgite clay material had a viscosity somewhat less than 5 cp. when the clay was fluid energy milled without magnesium base additive. With magnesium base material present with the clay during fluid energy milling, the apparent viscosity of a 5% dispersion of the colloidal clay material was increased to 22 cp.

The quantity of MgO or $Mg(OH)_2$ added to the clay in carrying out this invention is within the limits of about ½% to 5%, and preferably about ¾% to 2%, calculated on the weight of the clay containing 25% volatile matter (V.M.). When the basic magnesium material is employed in amount less than ½%, its effect upon the thickening power of the micron-sized clay product may not be significant. On the other hand, the basic magnesium material tends to lose its effectiveness when employed in excessive quantity and the thickening power of clay containing more than 5% magnesium base additive may be no greater than, or even less than, the thickening power of the clay in the absence of additive. Attapulgite clay from different mines, or even clay from different sections of the same mine, differ somewhat inter se in their response to fluid energy grinding in intimate association with the magnesium base additive. Therefore, for each starting clay, the optimum quantity of additive is best determined by simple experiment.

The attapulgite clay used as a starting material in the production of the improved micronized clay product must be clay which has never been dried to a V.M. below about 18%.

In putting this invention into practice, it is preferable initially to blend crushed raw attapulgite clay (which usually has a V.M. of about 48% to 50%) with hydratable MgO or $Mg(OH)_2$. Water is then added to make the clay mixture extrudable, the quantity of water being typically sufficient to form a mixture having a total V.M. of 55% to 60%. The mixing can be carried out in a pug mill, cement mixer or the like. The mixture is then extruded under pressure to form pellets which are dried at a product temperature below about 250° F. to a V.M. sufficient to permit them to be ground (e.g., a V.M. of about 20% to about 35%). The pellets are ground in a roller mill, hammer mill or the like to a mesh size sufficiently small for them to be handled in a fluid energy mill. The ground clay feed to the fluid energy mill can contain particles as coarse as about 30 mesh (Tyler). Good results have been obtained fluid energy milling a feed clay that was 100% by weight minus 48 mesh and about 50% minus 325 mesh.

The powdered magnesium base additive material can be intimately blended with the particles of colloidal attapulgite clay, preferably extruded clay particles, in the fluid energy mill provided care is taken to assure uniform blending of ingredients. As mentioned, the effectiveness of the magnesium base additive is dependent upon quantity of additive and, therefore, the presence of excessive magnesium base additive with any portion of the micronized clay will be detrimental to that portion of the micronized clay. The difficulty is obviated when the magnesium base additive is incorporated with the colloidal clay during the extrusion step.

The attapulgite clay is charged to the fluid energy mill at a V.M. of 18% to about 35%. In carrying out the fluid energy grinding of the clay in intimate association with the magnesium compound additive, unheated compressed air is useful as the elastic fluid.

In fluid energy mills, exemplified by the Jet-O-Mizer Mill or Blaw-Knox fluid energy pulverizer and MAJAC pulverizer, the clay particles are suspended in a stream of the elastic fluid and the stream is moved at high velocity in a manner such that clay particles collide. Preferred are fluid energy mills having jets opposed to each other so that particles picked up by opposed jets collide with each other and are ruptured by the collision. Colloid mills vary in their method of collecting micronized particles and removing them from the mill and various collection systems can be employed in carrying out this invention. Coarse particles are recirculated in the mill until at least about 99% by weight is finer than 44 microns. The average particle size of the fluid energy ground product can be varied by control of the air velocity, control of clay feed rate and adjustment of the V.M. of the clay feed. Typical fluid energy ground products have an average particle size within the range of about 3 to 20 microns, equivalent spherical diameter.

The fluid energy ground colloidal attapulgite clay product obtained by the process of this invention is especially adapted for thickening aqueous systems, particularly for thickening aqueous systems which must be substantially free from particles larger than 325 mesh. To obtain the benefit of the clay treatment, the systems into which the micronized clay material is incorporated should be free from agents which solubilize MgO or $Mg(OH)_2$, e.g., ammonium salts of mineral acids. The micronized clay product can also be used with a suitable surface active agent, such as an imidazoline, in thickening organic liquids such as hydrocarbon oils, toluene and mineral spirits. However, the effect of the incorporation of magnesium base compound with the colloidal clay will not be as remarkable in these organic systems as when the micronized product is used to thicken aqueous systems.

The following example, taken with the accompanying figure, is given to illustrate the effect of the addition of hydratable MgO to colloidal attapulgite clay which is ground into a micron size product in a fluid energy mill.

In accordance with this invention, raw attapulgite clay from a mine near Attapulgus, Georgia, was crushed to lumps about ½" to ¼" top size. The crushed clay, V.M. about 50%, was mixed with MgO (caustic burned) in amount of 1% of the weight of the clay, on a 25% V.M. clay basis. Water was added to the mixture and the ingredients pugged to uniformity. The pugged mixture at a V.M. of about 58%, was extruded in an auger-type extruder into random length pellets about ⅜" in diameter. The pellets were dried at a product temperature below about 250° F. to a V.M. slightly in excess of 25% and then crushed to 100% minus 48 mesh and about 50% minus 325 mesh. The roller milled extrudate was ground to 99.8% minus 325 mesh and an average particle size of about 5 microns, equivalent spherical diameter, in a fluid energy mill which employed compressed air at ambient temperature as the elastic fluid. In this mill, clay feed was fed into the lower bend of a duct and was suspended in a stream of circulating air. Jets of compressed air were fed into the lower bend of the duct by a plurality of nozzles, causing the air-suspended clay particles to strike each other. The mill was provided with an elutriation systems, whereby the fluid and fine particles were removed from the inner portion of the duct and coarser particles were recirculated.

For purposes of comparison, the air fluid energy milled colloidal attapulgite clay containing 1% MgO was compared with (1) a commercial air fluid energy milled colloidal attapulgite clay of about the same particle size distribution but made up without MgO addition and (2) a 95% minus and 325 mesh commercial colloidal attapulgite clay thickening agent obtained by extruding raw crushed attapulgite clay, mildly drying the extrudate and roller milling the dried extrudate to 95% minus 325 mesh. All samples as produced had a V.M. of about 25%.

To compare the colloidal properties of the three attapulgite clay samples, each sample was mixed with water in a pump mixer (Jabsco) for 30 minutes. Clay samples were used in amount of 5%, based on the weight of the water. Apparent viscosities of aqueous clay dispersion were measured with a Fann viscometer after 3, 6, 12, 18 and 30 minutes and mixing time to compare the rate of viscosity development with the different powdered attapulgite clay samples. The results are summarized in the accompanying figure.

A comparison of Curve C, representing the variation of apparent viscosity with mixing time for the colloidal attapulgite clay that had not been fluid energy milled, with Curve B, representing the variation of apparent viscosity with mixing time for the colloidal attapulgite clay that had been fluid energy milled, with Curve B, representing the variation of apparent viscosity with mixing time for the colloidal attapulgite clay product that had been fluid energy ground without addition of MgO, shows that at all mixing times within the range of 3 to 30 minutes aqueous systems made up with clay that had not been fluid energy ground were from about 200% to 250% more viscous than aqueous systems made up with the same quantity of fluid energy ground colloidal attapulgite clay. A comparison of these data shows also that with the fluid energy ground clay a 30 minute mixing time was required to provide an aqueous system having an apparent viscosity of about 4.8 cp. In contrast, with the same quantity of nonfluid energy milled clay, an aqueous system of the same apparent viscosity was obtained with only about ⅓ of the mixing time required with the fluid energy milled clay. A comparison of data represented by Curves B and C therefore demonstrates the adverse effect of fluid energy grinding upon the colloidal properties of attapulgite clay.

A comparison of Curve A (representing variation of apparent viscosity with mixing time for a dispersion of attapulgite clay that had been micronized in a fluid energy mill with 1% hydratable MgO) with Curve B, representing properties of the clay micronized in a fluid energy mill without MgO, shows that at mixing times of 3 to 30 minutes, systems made up with clay micronized in intimate association with MgO additive were from about 400% to about 700% more viscous than systems formulated with colloidal attapulgite clay that had been fluid energy ground without MgO additive. A comparison of the properties of colloidal clay that had been fluid energy ground in the presence of MgO (Curve A) with the properties of the roller milled clay (Curve C) shows that the former clay material produced aqueous systems that had almost twice the apparent viscosity of aqueous systems made up with latter clay in spite of the fact that the MgO treated clay had undergone a grinding treatment which normally would bring out a marked reduction in apparent viscosity of dispersions of the clay.

The data in the figure therefore illustrate the adverse effect of micronizing the colloidal form of attapulgite clay in a fluid energy mill can be minimized by conducting the fluid energy grinding of the clay in intimate association with a basic magnesium compound and that a fluid energy ground colloidal attapulgite clay product comparable with commercial mesh size colloidal attapulgite clay products can be obtained in this manner.

The particle size of all micron size clay products referred to herein refer to particle sizes by calcining the product at 1200° F. for ½ hour and subjecting the calcined clay to the well-known Casagrande sedimentation test. All mesh sizes refer to values obtained with Tyler screen size sieves.

I claim:
1. In a method for grinding colloidal attapulgite clay to provide a powdered material useful as a thickening agent by a process comprising forming a suspension of mesh size particles of the colloidal clay in a stream of an elastic fluid that is moving at high velocity and is at a temperature below which substantial dehydration of said clay occurs, said mesh size particles having been obtained by drying raw attapulgite clay at a product temperature below about 250° F. and crushing the dried clay, moving said suspension at high velocity and causing a substantial number of the clay particles in said moving elastic fluid to collide with each other, the improvement which comprises:

carrying out the grinding of said clay particles by collision of said clay particles in said moving elastic fluid in the presence of a small amount of a basic magnesium material selected from the group consisting of $Mg(OH)_2$ and hydratable MgO, the quantity of said basic magnesium material being such that the normal impairment of the water thickening properties of said clay as a result of being ground in said manner is reduced significantly.

2. The method of claim 1 in which said elastic fluid is air at ambient temperature.

3. The method of claim 1 in which said basic magnesium material is employed in amount of about 1% to about 5% of the weight of said clay, on a 25% volatile matter clay basis.

4. The method of claim 1 in which said basic magnesium material is intimately incorporated into said particles of clay before said particles are formed into said suspension and ground.

5. The method of claim 1 in which said basic magnesimu material is intimately incorporated into said particles of clay by extruding the clay with said basic magnesium material before said particles of clay are formed into said suspension and ground.

6. In a method for grinding colloidal attapulgite clay to provide a powdered material useful as a thickening agent by a process comprising forming a suspension of mesh size particles of colloidal attapulgite clay, a substantial portion of which are larger than 44 microns, in a stream of unheated air that is moving at high velocity, directing jets of unheated compressed air against said suspension in a manner such that a substantial number of clay particles in said moving stream impinge upon one another, removing fine particles produced by said impingement from the stream and subjecting the coarse particles to further impingement in said stream until substantially all of the clay particles are finer than 44 microns, the improvement which comprises:

forming said mesh size clay particles by uniformly mixing raw attapulgite clay with hydratable MgO in amount from about ½% to 5%, based upon the weight of said clay, on a 25% volatile matter clay basis, and water sufficient to form an extrudable mixture, extruding the mixture, drying the mixture to a V.M. not less than about 18% at a product temperature below about 250° F. and pulverizing the dried mixture, whereby the normal impairment of the water thickening properties of said clay as a result of being reduced in particle size below 44 microns in such fashion is minimized significantly.

7. Minus 44 micron particles of a mixture of colloidal attapulgite clay and from ½% to 5%, based upon the weight of said clay, on a 25% volatile matter clay basis, of a magnesium material selected from the group consisting of MgO and $Mg(OH)_2$, said minus 44 micron particles having been obtained by forming a suspension of mesh size particles of a mixture of colloidal clay and said magnesium material in a stream of unheated air moving at high velocity and directing jets of unheated compressed air against said suspension of particles in a manner such that particles impinge upon each other and are ruptured thereby.

References Cited by the Examiner

UNITED STATES PATENTS 2,665,259   1/54   Buffett _____ 106—73

TOBIAS E. LEVOW, *Primary Examiner.*

UNITED STATES PATENT OFFICE
CERTIFICATE OF CORRECTION

Patent No. 3,205,082                                    September 7, 1965

John B. Buffett

It is hereby certified that error appears in the above numbered patent requiring correction and that the said Letters Patent should read as corrected below.

Column 1, line 25, for "clays" read -- clay --; line 40, for "mul" read -- mud --; same column 1, line 53, for "laytex" read -- latex --; column 4, line 73, for "systems" read -- system --; column 5, line 6, strike out "and"; line 18, strike out "and", second occurrence; line 26, after "clay" insert -- product --; lines 27 to 30, strike out "milled, with Curve B, representing the variation of apparent viscosity with mixing time for the colloidal attapulgite clay product that had been fluid energy"; column 6, lines 39 and 40, for "magnesimu" read -- magnesium --; line 65, for "pulveriging" read -- -- pulverizing --.

Signed and sealed this 15th day of March 1966.

(SEAL)
Attest:

ERNEST W. SWIDER                                  EDWARD J. BRENNER
Attesting Officer                                         Commissioner of Patents